Patented Nov. 5, 1935

2,019,754

UNITED STATES PATENT OFFICE 2,019,754

PREPARATION OF ORGANIC ACIDS

John C. Woodhouse, Wilmington, Del., assignor, by mesne assignments, to E. I. du Pont de Nemours & Company, Wilmington, Del., a corporation of Delaware No Drawing. Application February 28, 1931, Serial No. 519,275

23 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide, in the presence of a suitable catalyst, acetic acid, methyl acetate, and methyl formate may be prepared in proportions which are governed by the particular operating conditions. Acids have likewise been prepared from methane and carbon dioxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested, include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulae $C_nH_{2n+1}COOH$ from alcohols having the structural formulae $C_nH_{2n+1}OH$ by subjecting the alcohols to the action of carbon monoxide in the presence of gaseous adsorbents. A still further object of this invention is to provide a process for the preparation of acetic acid by the interaction of methanol and carbon monoxide in the presence of catalysts of an adsorbing nature. Other objects will hereinafter appear.

I have found that organic acids can be prepared by the interaction of the aliphatic alcohols in the presence of carbon monoxide by passing the alcohols in the vapor phase together with carbon monoxide over a catalyst which is a member of the class of gaseous adsorbents such, for example, as the adsorbent oxides of aluminum, silicon, magnesium, titanium, zirconium, and tungsten, or similar bodies having like physical form and similar adsorbing qualities, or compounds and/or mixtures of these oxides.

The alcohol-carbon monoxide reactions which can be accelerated by the above described catalysts may be expressed as follows:

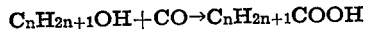
$$C_nH_{2n+1}OH + CO \rightarrow C_nH_{2n+1}COOH$$

In accordance with the particular operating conditions, it will be found that, in some instances, the acid may not be formed directly in the free state, but may be produced as an ester by condensation of the acid formed with the particular alcohol used in the process, as indicated below:

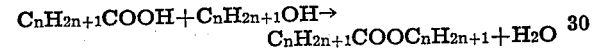
$$C_nH_{2n+1}COOH + C_nH_{2n+1}OH \rightarrow \\ C_nH_{2n+1}COOC_nH_{2n+1} + H_2O$$

or an alkyl formate and, of course, products resulting from side reactions may be produced. The formation of the alkyl formates may be illustrated by this reaction:

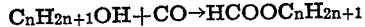
$$C_nH_{2n+1}OH + CO \rightarrow HCOOC_nH_{2n+1}$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350-700 atmospheres. The temperature within the reaction zone is quite critical as it determines to a large extent the product obtained; the proportion of the esters or acids formed varying almost directly with the temperature. For example, when the methanol-carbon monoxide reaction is being conducted at low temperatures a preponderance of methyl formate over methyl acetate will be formed. While, on the other hand, at higher temperatures the methyl acetate will be produced in considerably greater proportions than the methyl formate and other side products. It will be apparent, therefore, that in accord with the type of product desired by controlling the temperature at that degree which most favors its formation, say, within the limits of 150 and 500° C., a preponderance of that product may be produced.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to prevent too great a conversion of alcohol and carbon monoxide on one pass through the conversion apparatus. Other strictly inert gases will, usually, act similarly to nitrogen. It is, of course, understood that instead of introducing methanol itself into the reaction chamber substances or mixtures of substances which decompose to form alcohols or esters may be employed, but generally I prefer to introduce synthetic methanol directly into the gas stream leading to the converter.

My process can be conveniently carried out by passing purified carbon monoxide into methanol, preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my adsorbing catalyst,—the temperature of the reaction chamber being maintained at approximately 300° C. and the pressure held in the neighborhood of 350 atmospheres.

The catalysts which I employ include the catalysts which are members of the class of gaseous adsorbents, such as the adsorbent oxides of silicon, magnesium, aluminum, titanium, zirconium, and tungsten, either alone or as mixtures. When referring to "gaseous adsorbents" in this application the widest usage of the phrase is not to be implied. It will be understood that this phase is given herein the well known technical meaning of the chemist and that ascribed to it by Herbert Freundlich, in "Colloid & Capillary Chemistry" Hatfield's Translation from the 3rd German Edition, last paragraph, page 106, through page 109, which may be defined as preferably porous solid bodies usually colloidal which are characterized by rapid attainment of equilibrium in the taking up of reproducible quantities of gas for any given set of conditions. To illustrate,— aluminum oxide when prepared by the calcination of aluminum nitrate would not be included under "gaseous adsorbents", while alumina gel would be included. The presence of a small amount of impurity with these adsorbent catalytic bodies, say, up to 10% by weight of the catalyst, does not appear to have great inhibiting action on the reaction. It is preferable, however, to employ these bodies in a comparatively pure form.

These catalysts when used as such are not to be confused with similar material when used as a support. In the latter case the interstices of the oxide are utilized to increase the surface area, presented to the reactants, of the particular catalyst supported thereover. The oxide surface is thereby covered and the resulting catalytic effect is due to the catalyst supported thereon. On the other hand, when using an oxide, having gaseous adsorbent properties, as a catalyst its surface area is not covered with another material and its catalytic activity is due to the oxide particles and/or the configuration of these particles exposed directly to the reactants.

Not only can methanol be catalyzed in the presence of carbon monoxide and my catalyst to acetic acid or its isomer methyl formate or the condensation product of the acetic acid with methanol, i. e. methyl acetate, but the higher alcohols, such as ethyl alcohol, propyl alcohol, butyl alcohol, and even the higher molecular weight alcohols, such for example, as hexyl alcohol or octyl alcohol may be similarly converted into an acid having correspondingly one more carbon atom than the alcohol treated. In fact, my process and catalyst may be employed with any of the monohydric alcohols, providing these alcohols volatilize without decomposition. When treating the higher aliphatic alcohols, some of which are not water soluble, and particularly if water be desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which, however, will modify to some extent the type of product obtained.

When preparing acetic acid and other organic compounds by the interaction of methanol with carbon monoxide, the predominant products obtained will be, generally, acetic acid, methyl formate, and methyl acetate. The methyl formate may be molecularly rearranged to its isomer acetic acid, by treatment in the presence of one of the known catalysts for this reaction, while the methyl acetate is preferably saponified to that form. Any well known saponifying process may be employed for that purpose.

I will now describe a specific embodiment of my process but it will be understood that the details therein given and the compounds employed, either as reactants or catalysts, in no way restrict the scope of this invention, but merely illustrate one manner in which my process may be carried out.

A gaseous mixture, containing 85% carbon monoxide and 5% each of methanol, water vapor, and hydrogen, is passed over a titanium oxide gel catalyst under a pressure of 700 atmospheres and a temperature of 300° C. This catalyst is disposed in a suitable catalytic chamber for the carrying out of exothermic gaseous reactions. The condensate obtained upon the cooling of the converted gases contains approximately 10% free acetic acid together with methyl acetate, and some unconverted methanol. The acid is obtained from the mixture by simple distillation. The methyl acetate is treated with sulfuric acid and distilled to obtain its acetic acid content.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated by catalysts which are designated as gaseous adsorbents, such as the adsorbent oxides of silicon, aluminum, magnesium, titanium, zirconium, and tungsten.

I claim:

1. A process for the preparation of organic compounds containing a negative radical of an aliphatic acid which comprises contacting with an oxide catalyst, which is also a gaseous adsorbent and the sole catalyst, a compound selected from the group consisting of the monohydroxy aliphatic alcohols, the alkyl ethers and the alkyl esters, in the presence of carbon monoxide.

2. A process for the preparation of organic compounds containing a negative radical of an aliphatic acid which comprises contacting with an oxide catalyst, which is also a gaseous adsorbent and the sole catalyst, an aliphatic alcohol which is not substantially decomposed when vaporized, in the presence of carbon monoxide.

3. A process for the preparation of organic compounds containing a negative radical of an aliphatic acid which comprises contacting with an oxide catalyst, which is also a gaseous adsorbent and the sole catalyst, a monohydroxy aliphatic alcohol which is not substantially decomposed when vaporized, in the presence of carbon monoxide.

4. A process for the preparation of organic compounds containing a negative radical of an aliphatic acid which comprises contacting with an oxide catalyst, which is also a gaseous adsorbent and the sole catalyst, methanol in the presence of carbon monoxide.

5. A process for the preparation of organic compounds containing a negative radical of an aliphatic acid which comprises contacting with oxide of silicon, which is a gaseous adsorbent and the sole catalyst, a compound selected from the group consisting of the monohydroxy aliphatic alcohols, the alkyl ethers and the alkyl esters, in the presence of carbon monoxide.

6. A process for the preparation of organic compounds containing a negative radical of aliphatic acid which comprises contacting with oxide of aluminum, which is also a gaseous adsorbent and the sole catalyst, a compound selected from the group consisting of the monohydroxy aliphatic alcohols, the alkyl ethers and the alkyl esters in the presence of carbon monoxide.

7. A process for the preparation of organic compounds containing a negative radical of an aliphatic acid which comprises contacting with oxide of magnesium, which is also a gaseous adsorbent and the sole catalyst, a compound selected from the group consisting of the monohydroxy aliphatic alcohols, the alkyl ethers and the alkyl esters, in the presence of carbon monoxide.

8. A process for the preparation of organic compounds containing a negative radical of an aliphatic acid which comprises contacting with an oxide of silicon, which is also a gaseous adsorbent and the sole catalyst, an aliphatic alcohol which is not substantially decomposed when vaporized, in the presence of carbon monoxide.

9. A process for the preparation of organic compounds containing a negative radical of an aliphatic acid which comprises contacting with an oxide of aluminum, which is also a gaseous adsorbent and the sole catalyst, an aliphatic alcohol which is not substantially decomposed when vaporized, in the presence of carbon monoxide.

10. A process for the preparation of organic compounds containing a negative radical of an aliphatic acid which comprises contacting with an oxide of magnesium, which is also a gaseous adsorbent and the sole catalyst, an aliphatic alcohol which is not substantially decomposed when vaporized, in the presence of carbon monoxide.

11. A process for the preparation of organic compounds containing a negative radical of an aliphatic acid which comprises contacting with an oxide of silicon which is also a gaseous adsorbent and the sole catalyst, a monohydroxy aliphatic alcohol which is not substantially decomposed when vaporized, in the presence of carbon monoxide.

12. A process for the preparation of organic compounds containing a negative radical of an aliphatic acid which comprises contacting with an oxide of aluminum which is also a gaseous adsorbent and the sole catalyst, a mono-hydroxy aliphatic alcohol which is not substantially decomposed when vaporized, in the presence of carbon monoxide.

13. A process for the preparation of organic compounds containing a negative radical of an aliphatic acid which comprises contacting with an oxide of magnesium which is also a gaseous adsorbent and the sole catalyst, a mono-hydroxy aliphatic alcohol which is not substantially decomposed when vaporized, in the presence of carbon monoxide.

14. In a vapor phase process for the preparation of saturated monocarboxylic aliphatic organic acids, the step which comprises contacting carbon monoxide and a compound selected from the group consisting of monohydroxy aliphatic alcohols, the alkyl ethers, and the alkyl esters, with a metal oxide catalyst which is also a gaseous adsorbent.

15. In a process for the preparation of monocarboxylic aliphatic organic acids, the step which comprises contacting an aliphatic monohydroxy alcohol which is not substantially decomposed when vaporized and carbon monoxide with a metal oxide catalyst which is also a gaseous adsorbent.

16. In a process for the preparation of acetic acid the step which comprises contacting methanol and carbon monoxide with a metal oxide catalyst which is also a gaseous adsorbent.

17. A process for the preparation of organic compounds containing a negative radical of an aliphatic acid which comprises passing carbon monoxide through an aqueous monohydroxy aliphatic alcohol solution and subsequently contacting the resultant vapor at an elevated pressure and temperature with an oxide catalyst, which is also a gaseous adsorbent, as the sole catalyst for the reaction.

18. A process for the preparation of organic compounds containing a negative radical of an aliphatic acid which comprises passing carbon monoxide through an aqueous monohydroxy aliphatic alcohol solution and subsequently contacting the resultant vapor at an elevated temperature and pressure with an oxide of silicon, which is also a gaseous adsorbent, as the sole catalyst for the reaction.

19. A process for the preparation of organic compounds containing a negative radical of an aliphatic acid which comprises passing carbon monoxide through an aqueous monohydroxy aliphatic alcohol solution and subsequently contacting the resultant vapor at an elevated temperature and pressure with an oxide of aluminum, which is also a gaseous adsorbent, as the sole catalyst for the reaction.

20. A process for the preparation of organic compounds containing a negative radical of an aliphatic acid which comprises passing carbon monoxide through an aqueous monohydroxy aliphatic alcohol solution and subsequently contacting the resultant vapor at an elevated temperature and pressure with an oxide of magnesium, which is also a gaseous adsorbent, as the sole catalyst for the reaction.

21. A process for the preparation of organic compounds containing a negative radical of an aliphatic acid which comprises subjecting methanol, carbon monoxide, and water vapor at a pressure of 25–900 atmospheres and a temperature of 250–500° C., to the action of an oxide of silicon, which is also a gaseous adsorbent, as the sole catalyst for the reaction.

22. A process for the preparation of organic compounds containing a negative radical of an aliphatic acid which comprises subjecting methanol, carbon monoxide, and water vapor at a pressure of 25–900 atmospheres and a temperature of 250–500° C., to the action of an oxide of aluminum, which is also a gaseous adsorbent, as the sole catalyst for the reaction.

23. A process for the preparation of organic compounds containing a negative radical of an aliphatic acid which comprises subjecting methanol, carbon monoxide, and water vapor at a pressure of 25–900 atmospheres and a temperature of 250–500° C., to the action of an oxide of magnesium, which is also a gaseous adsorbent, as the sole catalyst for the reaction.

JOHN C. WOODHOUSE.